United States Patent
Boll et al.

(10) Patent No.: US 9,015,966 B2
(45) Date of Patent: Apr. 28, 2015

(54) HARVESTING DEVICE FOR PICKING UP PLANTS

(71) Applicant: Claas Saulgau GmbH, Bad Saulgau (DE)

(72) Inventors: Ulrich Boll, Bad Saulgau (DE); Stefan Loebe, Bad Saulgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 126 days.

(21) Appl. No.: 13/904,499

(22) Filed: May 29, 2013

(65) Prior Publication Data

US 2013/0333345 A1 Dec. 19, 2013

(30) Foreign Application Priority Data

Jun. 13, 2012 (DE) .......................... 10 2012 011 576

(51) Int. Cl.
*A01D 39/00* (2006.01)
*A01F 15/07* (2006.01)
*A01D 89/00* (2006.01)
*A01D 90/02* (2006.01)
*A01F 15/10* (2006.01)

(52) U.S. Cl.
CPC .............. *A01D 89/001* (2013.01); *A01D 90/02* (2013.01); *A01F 15/10* (2013.01); *A01D 89/008* (2013.01)

(58) Field of Classification Search
CPC . A01D 43/06; A01D 43/006; A01D 41/1243; A01D 89/00; A01D 89/004; A01D 89/008; A01D 90/02; A01D 90/04; A01F 15/10; A01F 15/0825; A01F 15/07; A01F 15/08

USPC ....... 56/1, 10.8, 13.5, 16.4 R, 341, 364, 17.2, 56/119; 100/2, 70 R, 189, 142, 740; 198/697

See application file for complete search history.

(56) References Cited

U.S. PATENT DOCUMENTS

| | | | | |
|---|---|---|---|---|
| 3,701,239 A * | 10/1972 | Hennen | .......................... | 56/13.5 |
| 3,924,391 A * | 12/1975 | Cheatum | .......................... | 56/364 |
| 3,925,971 A * | 12/1975 | Goering et al. | .................. | 56/208 |
| 4,106,267 A * | 8/1978 | White | .................. | 56/1 |
| 4,464,890 A * | 8/1984 | Scholtissek et al. | ............ | 56/364 |
| 4,581,880 A * | 4/1986 | Klinner | .......................... | 56/364 |
| 5,090,187 A * | 2/1992 | Mews | .............................. | 56/364 |

(Continued)

FOREIGN PATENT DOCUMENTS

| AT | 397 173 | 6/2008 |
|---|---|---|
| DE | 24 44 098 | 3/1976 |

(Continued)

*Primary Examiner* — Robert Pezzuto
(74) *Attorney, Agent, or Firm* — Michael J. Striker

(57) ABSTRACT

A harvesting device for harvesting and/or picking up crop such as plants or plant parts located on the field is configured with a pick-up unit with a working width oriented transversely to the direction of travel (F), for picking up the crop. The pick-up unit has a multiplicity of pick-up elements, each of which can move at least partially in the vertical direction and are disposed along the working width. Outer ends of the movable pick-up elements form envelope curves during operation. A conveyor unit for further conveying the picked-up crop is provided downstream of the pick-up unit in the direction of the crop flow. The harvesting device so arranged improves the pick-up or intake of crop because the conveyor unit at least partially overhangs the envelope curves of the pick-up elements in the direction of travel (F).

10 Claims, 1 Drawing Sheet

(56) References Cited

U.S. PATENT DOCUMENTS 5,819,515 A * 10/1998 Ratzlaff et al. ............... 56/341
5,950,410 A * 9/1999 O'Brien et al. ............... 56/341
6,895,734 B2 * 5/2005 Ameye ........................ 56/10.8

FOREIGN PATENT DOCUMENTS

DE    30 22 630    12/1981
EP    1 741 330    1/2007

* cited by examiner

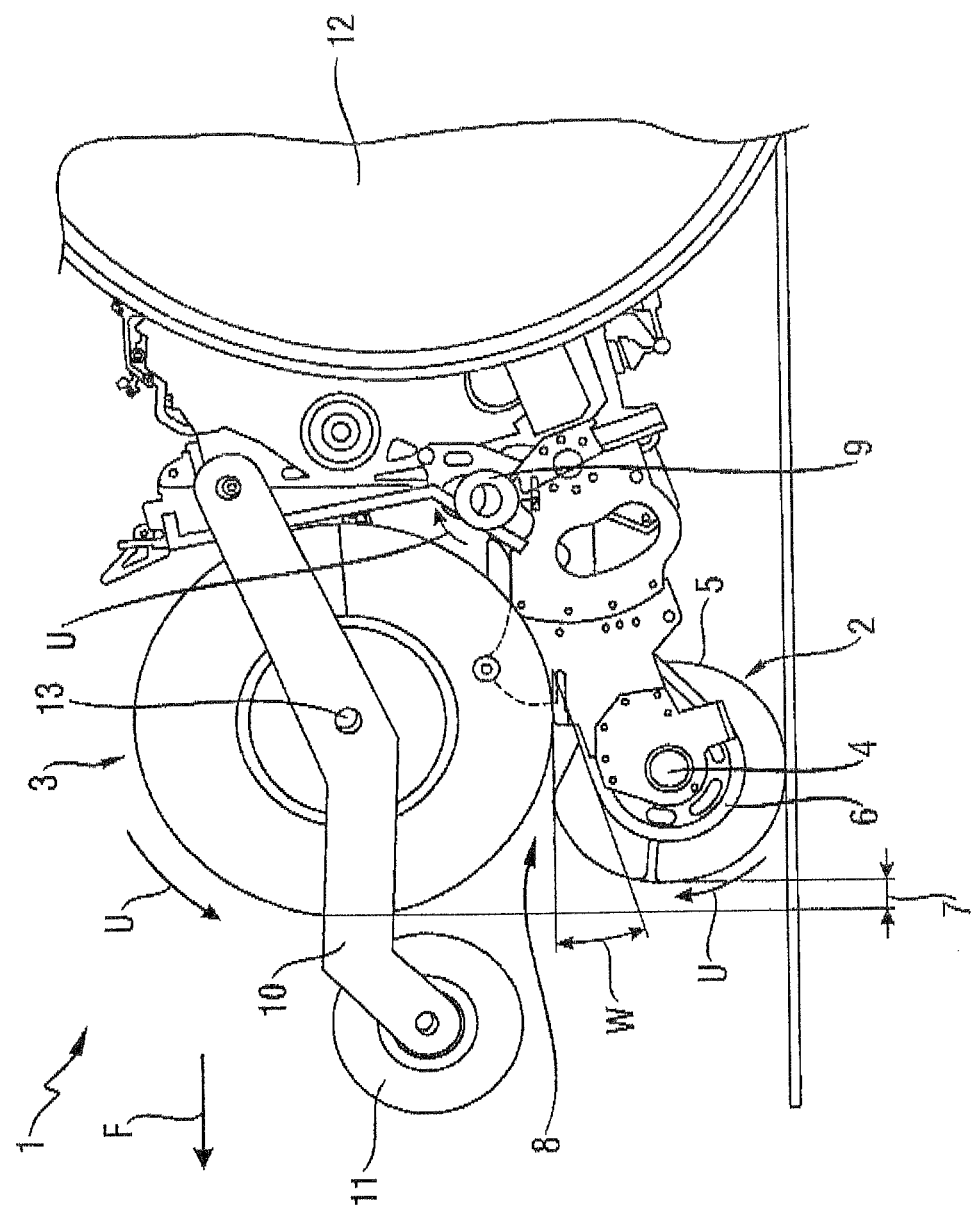

HARVESTING DEVICE FOR PICKING UP PLANTS

CROSS-REFERENCE TO A RELATED APPLICATION

The invention described and claimed hereinbelow is also described in German Patent Application DE 10 2012 011 576.8, filed on Jun. 13, 2012. This German Patent Application, subject matter of which is incorporated herein by reference, provides the basis for a claim of priority of invention under 35 U.S.C. 119(a)-(d).

BACKGROUND OF THE INVENTION

The invention relates to a harvesting device for harvesting and/or picking up crop and/or plants or plant parts located on the field.

"Pick-up" devices for picking up crop such as hay, straw, silage, "energy plants", etc., have been used for decades in agriculture. Self-loading forage wagons, balers, and forage harvesters are equipped with appropriate pick-up front attachments.

These pick-ups comprise a pick-up roller, which has numerous tines disposed transversely to the direction of travel. The tines rotate along controlled curved trajectories during operation. The tines grab the crop, which usually has been mowed, and convey the crop upwardly in the vertical direction. The crop that is picked up in this manner is directed to a conveyor device, which further conveys the crop. In the case of a self-loading forage wagon, for example, the crop is often cut or shortened with the aid of a header.

In a pick-up front attachment for a forage harvester, the crop that is picked up is conveyed transversely by the conveyor device, usually toward the middle, to an intake chute. The crop, which has thereby been gathered in the center, is cut up via a cutting and chopping assembly and is usually fed via a lower discharge chute to a separate agricultural hauling vehicle.

In the case of a forage harvester in particular, given that the agricultural working devices continue to increase in size, a large quantity of crop is often combined to form a common swath. Therefore, such forage harvesters must pick up and process normal swaths and, at times, very large swaths during operation. It has been shown that fluctuating quantities of crop to be picked up can cause the further conveyance and chopper load to be inconsistent.

Specifically in the case of particularly large quantities of crop to be picked up, it has been shown that the forage harvester or the self-loading forage wagon, etc., can only reach a relatively slow ground speed. However, because the crop is picked up from the field/ground by means of the conveyor tines substantially vertically upwards and the conveyor tines therefore initially move opposite the direction of travel, the intake and grabbing of the crop is partially supported and conveyed further via the direction of travel and the ground speed. Therefore, the pick-up or intake of the crop also is dependent on the ground speed to a certain extent, and at times (e.g., low ground speeds), is not optimal.

SUMMARY OF THE INVENTION

The present invention overcomes the shortcomings of known arts, such as those mentioned above.

The invention improves the pick-up or intake of crop using an agricultural harvesting device.

In an embodiment, the invention provides a harvesting device wherein a conveyor unit at least partially overhangs the envelope curves of the pick-up elements in the direction of travel.

With the aid of such a conveyor unit, which overhangs the envelope curves of the pick-up elements or the tines of the pick-up element, the crop that is conveyed upwardly in the vertical direction by the pick-up elements or the tines of the pick-up elements is advantageously grabbed by the conveyor unit and thereby can be very effectively conveyed further. Therefore, an advantageous intake of the crop that is operationally more reliable can be achieved even at particularly low ground speeds.

In contrast to the invention, the conveyor unit downstream of the pick-up elements or the pick-up tines is known to be disposed in conventional harvesting devices behind the front ends of the envelope curves of the pick-up elements, as viewed in the direction of travel. In the prior art, the mutual alignment was instead one behind the other as viewed in the direction of travel.

According to the invention, the conveyor unit is now disposed in the vertical direction above the pick-up unit or the pick-up elements. That is, by means of the conveyor unit according to the invention (which overhangs the envelope curves of the pick-up elements), the crop that is conveyed vertically upwards by means of the pick-up elements is now advantageously grabbed and advantageously drawn inward due to the opposing directions of rotation of the pick-up elements and the conveyor unit.

The result, according to the invention, is a direction of rotation oriented substantially opposite the direction of travel in the intermediate region between the pick-up unit and the conveyor unit and a (nearly parallel) direction of conveyance of the two units for the crop. The intake (which is improved as a result), and the improved further conveyance of the picked-up crop results in lower loads and forces on these components. This has an advantageous effect on the structural design and the service life of the associated components.

The pick-up elements of the pick-up unit form envelope curves (which are generated due to the rotational motion), and the conveyor unit and the conveyor elements thereof form (second) envelope curves or envelope circles. According to the invention, the envelope curves of the pick-up elements and the (second) envelope curves of the conveyor unit are now disposed with respect to one another such that virtual tangent lines placed on these curves form an angle with respect to one another that is smaller compared to the prior art.

The movable pick-up elements comprise a multiplicity of guide plates or the like, along which the crop is guided and between which the conveyor tines are moved and enter completely in the rearward motion thereof and re-emerge in the lower region close to the ground. Hence, the pick-up elements pick up the crop from the ground (in the front region of the pick-up unit). According to the invention, these guide elements or guide plates also form a smaller angle with respect to the conveyor unit than was the case in the prior art. This also results in improved intake and lower loads on the available components.

Advantageously, the conveyor unit comprises at least one cross conveyance device for conveying crop along the rotational axis or transversely to the direction of travel and, in particular, substantially horizontally. The cross conveyance device preferably comprises at least one feed auger. This cross conveyance device or the feed auger makes it possible, in the case of a forage harvester or the like to advantageously further convey the crop to a gathering section or gathering channel, which is usually centrally located. For example, the conveyor unit comprises two conveyor augers, which are oriented toward one another, or a conveyor auger rotating to the right and a conveyor auger rotating to the left, thereby enabling the crop to be advantageously further conveyed toward the middle on both sides of the gathering section.

In an embodiment, the largest diameter of the envelope curve of the conveyor auger of the conveyor unit is larger, at least by a factor of 1.5, than the largest diameter of the envelope curves of the pick-up elements. It has been shown that an advantageous arrangement or an advantageous ratio is generated as a result, by which the intake of the crop between the conveyor unit and the pick-up unit can be achieved in a particularly advantageous manner. Even when crop quantities fluctuate considerably, relatively consistent processing or consistent intake of the crop flow can be achieved as a result. Diameters of the conveyor auger of the conveyor device of approximately 900 mm are advantageous, for example. Commercially available or standard pick-up units or pick-up elements can be used in a conveyor auger of that size in order to obtain the ratio according to the invention or the factor 1.5 between the diameter of the conveyor auger and the diameter of the pick-up elements.

A relatively great depth of the turn of the conveyor auger can be achieved by a conveyor auger of such size, thereby making it possible to process particularly large quantities of crop. The requirements of agricultural working machines, which continue to increase in size, are thereby satisfied. This means that rotary swathers, for example, that have a particularly large working width can generate a particularly large swath, which can then be advantageously picked up and drawn inward with the aid of a harvesting device according to the invention.

In an embodiment, a conveyor device for further conveying the picked-up crop, which rotates about a second rotational axis, is provided downstream of the conveyor unit in the direction of flow of the crop. This conveyor device effectively prevents crop from becoming stuck behind the conveyor unit or behind the conveyor auger, i.e. in the so-called "trough" or in a section downstream of the conveyor auger as viewed in the direction of travel, and in the lower region, and ensures that crop is adequately grabbed by the conveyor unit and is further conveyed.

The conveyor device enables the crop to be advantageously conveyed at least partially vertically, thereby permitting the crop to be grabbed and further conveyed by the conveyor auger or by the turn of the conveyor auger, even when a particularly large conveyor auger is used.

The conveyor device is preferably disposed at least in front of a gathering channel for gathering the crop, as viewed in the direction of the crop flow. In the case of a forage harvester, for example, a gathering channel is provided at a standard position in the central region. The advantageous conveyor device in front of this gathering channel makes it possible, even in the case of particularly large conveyor augers or the like, for the crop to be advantageously fed to the gathering channel or for the crop to be lifted vertically and fed to the gathering channel.

Advantageously, a width of the conveyor device substantially corresponds to a width of the gathering channel. This ensures that the gathering channel is filled in an advantageous manner. Basically, the conveyor device also extends beyond the width of the gathering channel and/or extends across the entire working width of the harvesting device and/or the conveyor unit or the conveyor auger.

The conveyor device is preferably in the form of a substantially cylindrical conveyor device. It has been shown that it is sufficient to design the conveyor device substantially as a smooth tube or a smooth roller or the like in the region of the gathering channel. It can be advantageous for the conveyor device to have transverse conveyance in the region next to the gathering channel.

For example, conveyor augers and/or conveyor grooves can be equipped with an advantageous helical shape here.

Basically it is advantageous for the circumferential speed of the conveyor device to be slightly greater than the circumferential speed of the conveyor unit or the conveyor auger thereof. It has been shown that the crop is further conveyed particularly effectively as a result.

In general, a type of "shredding effect" is generated according to the invention by means of the conveyor unit or the conveyor auger. This means that the picked-up crop is advantageously grabbed and drawn into the harvesting device with an advantageous pulling force. This drawing-in or grabbing of the crop to be picked up is advantageously achieved by means of the conveyor unit, which overhangs the envelope curves of the pick-up elements.

BRIEF DESCRIPTION OF THE DRAWINGS

Further features and advantages of the invention will become apparent from the description of embodiments that follows, with reference to the attached figures, wherein:

FIG. 1 is a schematic cross-sectional illustration of a harvesting device according to the invention.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 depicts a so-called "pick-up" 1 schematically. This pick-up 1 is provided, for example, as a front attachment for a forage harvester, which is not depicted in greater detail. Only a portion of a land wheel 12 of the forage harvester is shown in FIG. 1.

The pick-up 1 comprises a pick-up unit 2 and a conveyor auger 3. The pick-up unit 2 comprises a multiplicity of tines, which rotate about an axis 4 and are guided along non-illustrated curved trajectories. The curved trajectory that is followed results in an envelope curve 5 of the tine ends (which largely corresponds to a circular cross-section), but which is somewhat flattened in the upper region facing toward the back.

The pick-up unit 2 also comprises guide plates 6, between which the tines plunge (as is generally known), and along which the crop is guided or conveyed.

A conveyor auger 3, which rotates about a rotational axis 13, is disposed downstream of the pick-up unit 2 in the direction of the crop flow. According to the invention, the conveyor auger 3 or the conveyor unit is mounted at least partially in front of the envelope curve 5 of the pick-up tines or the pick-up unit 2, as viewed in the direction of travel. To illustrate this overhang, FIG. 1 shows a first, vertical tangent line to the envelope curve 5 of the pick-up unit 2 and a second, vertical tangent line to the conveyor auger 3. As clearly shown, there is an overhang 7 of the conveyor auger 3 with respect to the pick-up unit 2 or the envelope curve 5 thereof.

By this arrangement of the conveyor auger 3 with respect to the pick-up unit 2, an angle W between (virtual) tangent lines to the plates 6 and the conveyor auger 3 or the envelope circle of the conveyor auger 3 results that is more acute compared to the prior art. The result of this more acute angle W is improved intake or a reduction in the pulling forces/compression forces on the associated components since the crop is now grabbed opposite the direction of travel F in the intermediate region 8 in an acute angle and is drawn or flows into the pick-up 1. That is, the envelope curves 5 of the pick-up unit 2 and the conveyor auger 3 almost touch one another/are tangential in the intermediate region 8 between the conveyor auger 3 and the pick-up unit 2.

In contrast, in pick-ups according to the prior art, the conveyor augers are disposed clearly behind the pick-up unit 2, and so the contact of the conveyor auger with the picked-up crop previously took place at a much more obtuse angle. That is, the circumferential motion U of the conveyor auger 3 previously took place nearly at a right angle with respect to the plates 6, and so relatively great compressive forces acted on the conveyor auger 3 and the plates 6 or the downstream guide plates/components of the pick-up 1.

FIG. 1 also clearly shows that an additional intake roller 9 is provided (as compared to the prior art). The intake roller 9 is disposed behind the conveyor auger 3, with respect to the direction of travel, and in the lower region thereof. This intake roller 9 prevents crop from becoming deposited in this region. This intake roller 9 is preferably designed as a cylindrical or smooth tube and is disposed in front of a non-illustrated gathering channel, in particular a central or middle gathering channel, of the forage harvester.

According to the invention, a much larger conveyor auger 3 having a diameter of approximately 900 mm or larger, for example, is provided. The core diameter can be approximately 500 mm, for example. The intake roller 9, which is disposed in the region of a so-called trough of the conveyor auger 3, advantageously has a circumferential speed that is greater than the circumferential speed of the conveyor auger 3. This ensures that the crop is advantageously conveyed to the gathering channel or into the gathering channel.

For example, the conveyor auger 3 is driven from one side of the harvesting device or pick-up 1, and the pick-up unit 2 is driven from the other side. The conveyor auger 3 is disposed on a pivotable rocker arm 10 on the ends of which one or two advantageous intake rollers 11 are provided. Such intake rollers 11 are already state of the art.

LIST OF REFERENCE SIGNS 1 pick-up
2 pick-up unit
3 conveyor auger
4 axis
5 envelope curve
6 guide plate
7 overhang
8 region
9 intake roller
10 rocker arm
11 intake roller
12 land wheel
13 axis
F direction of travel
U circumferential motion
W angle As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A harvesting device for harvesting crop or for picking up crop including plants, plant parts or both located on a field, comprising:
   at least one pick-up unit (2) having a working width oriented transversely to a direction of travel (F), for picking up the crop, the pick-up unit (2) having a multiplicity of pick-up elements, which move at least partially in the vertical direction and which are disposed along the working width, wherein outer ends of the movable pick-up elements form envelope curves (5) during operation, and
   a conveyor unit (3) rotating about a rotational axis (13) for further conveying the picked-up crop, the conveyor unit (3) provided downstream of the pick-up unit (2) in a direction of a crop flow and at least partially overhanging the envelope curves (5) of the movable pick-up elements in the direction of travel (F).

2. The harvesting device according to claim 1, wherein the conveyor unit (3) comprises at least one cross conveyance device for conveying the picked-up crop along the rotational axis (13).

3. The harvesting device according to claim 2, wherein the cross conveyance device comprises at least one feed auger.

4. The harvesting device according to claim 1, wherein a largest diameter of the envelope curves of a conveyor auger of the conveyor unit (3) is larger, at least by a factor of 1.5, than the largest diameter of the envelope curves (5) of the pick-up elements.

5. The harvesting device according to claim 1, wherein a conveyor device (9), which rotates about a second rotational axis, is disposed behind the conveyor unit (3) in the direction of the crop flow, for further conveying the picked-up crop.

6. The harvesting device according to claim 5, wherein the conveyor device (9) is disposed at least in front of a gathering channel, as viewed in the direction of the crop flow, for gathering the picked-up crop.

7. A harvesting device according to claim 6, wherein a width of the conveyor device (9) substantially corresponds to a width of the gathering channel.

8. A forage harvester comprising a harvesting device according to claim 1.

9. A self-loading forage wagon comprising a harvesting device according to claim 1.

10. A baler comprising a harvesting device according to claim 1.

* * * * *